US007777642B2

(12) United States Patent
Kim et al.

(10) Patent No.: US 7,777,642 B2
(45) Date of Patent: Aug. 17, 2010

(54) INTEGRATED REMOTE CONTROL SYSTEM FOR A PLURALITY OF DIGITAL DEVICES

(75) Inventors: Ji Yong Kim, Daejeon (KR); Ji Young Kwak, Daejeon (KR); Kyung Hee Lee, Daejeon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 907 days.

(21) Appl. No.: 11/637,021

(22) Filed: Dec. 12, 2006

(65) Prior Publication Data

US 2008/0036570 A1 Feb. 14, 2008

(30) Foreign Application Priority Data

Aug. 8, 2006 (KR) ...................... 10-2006-0074663

(51) Int. Cl.
*G08C 19/00* (2006.01)
*H04L 17/02* (2006.01)
*G06K 7/10* (2006.01)

(52) U.S. Cl. .............. 340/825.69; 341/176; 235/462.46

(58) Field of Classification Search ............ 340/825.69; 341/176; 235/462.46
See application file for complete search history.

(56) References Cited

U.S. PATENT DOCUMENTS

| | | | | |
|---|---|---|---|---|
| 5,357,094 | A * | 10/1994 | Baldwin | 235/462.02 |
| 6,225,938 | B1 * | 5/2001 | Hayes et al. | 341/176 |
| 6,791,467 | B1 * | 9/2004 | Ben-Ze'ev | 340/825.69 |
| 7,224,903 | B2 * | 5/2007 | Colmenarez et al. | 398/106 |
| 7,415,212 | B2 * | 8/2008 | Matsushita et al. | 398/140 |
| 2002/0140571 | A1 * | 10/2002 | Hayes et al. | 340/825.72 |
| 2008/0188959 | A1 * | 8/2008 | Kneissler | 700/83 |

FOREIGN PATENT DOCUMENTS

KR 1020030077513 10/2003

OTHER PUBLICATIONS

Jun Rekimoto, et al.; "The World through the Computer: Computer Augmented Interaction with Real World Environments"; UIST '95; Nov. 14-17, pp. 29-36.

* cited by examiner

*Primary Examiner*—Benjamin C Lee
*Assistant Examiner*—Andrew Bee
(74) *Attorney, Agent, or Firm*—Lowe Hauptman Ham & Berner LLP

(57) ABSTRACT

An integrated remote control system includes a remote control device for selecting and controlling a plurality of digital devices, each including a bit pattern tag having location information and device information. The remote control device includes a display, a light emitting module for emitting light toward the digital devices, a sensor for recognizing the tags of the digital devices, and a controller for analyzing the tags recognized by the sensor to provide the display information of the digital devices on the display and then controlling a digital device selected from the displayed digital devices.

12 Claims, 3 Drawing Sheets

INTEGRATED REMOTE CONTROL SYSTEM FOR A PLURALITY OF DIGITAL DEVICES

FIELD OF THE INVENTION

The present invention relates to a integrated remote control system for a plurality of electric appliances; and, more particularly, to a integrated remote control system for a plurality of digital devices, capable of easily selecting and remote-controlling digital devices, e.g., a home network, at a long distance.

BACKGROUND OF THE INVENTION

A home networking is a technique capable of remote-controlling major digital devices such as electric appliances including a refrigerator, an air conditioner, a microwave oven, a television set and the like through a wire or a wireless network, e.g., wire/wireless Internet, and sharing contents between the digital devices. Such a home networking is regarded as a core element of a market for next generation digital devices.

Once the home network is furnished, the digital devices can be desirably controlled by a mobile terminal or an indicator such as a remote control and the like inside or outside a house. Moreover, the digital devices of the home network enable a connection of a communication network such as Internet and the like, a transmission of motion pictures and a transmission/reception of e-mails inside/outside the house, so that a real cyber home can be created.

The home network technique having such advantages can be divided into a home server, a development and a standardization of a middleware for driving a home server and a development and a standardization of a transmission technique between digital devices. Among them, the most important element is the middleware that is a communication protocol standard for operating each of the digital devices based on a home server.

A current international standard framework of a home network is largely divided into "HAVi" (Home Audio Video interoperability) developed by household appliances enterprises such as Sony, Philips, Panasonic, Hitachi and the like; "UPnP" (Universal Plug and Play) developed by computer enterprises such as Microsoft, Intel and the like; and Sun Microsystem's "Jini" (Java Intelligent Network Infrastructure), and they severely compete with each other to take the initiative for standardization.

Accordingly, there has been increased the importance of the remote control apparatus having a communication protocol standard that is a middleware, such as a home server of a home networking, for remote-controlling a plurality of digital devices.

Recently, there has been suggested an integrated control system for controlling digital devices included in the home network by using an RFID tag. However, such an integrated control system is cost-inefficient because the electric appliances are recognized and controlled by using the RFID tag.

Although there is being developed a technique enabling a remote indicator to recognize information of digital devices included in the home network with the use of tags attached to the corresponding appliances, it has a high recognition error rate due to the circumstances such as a distance, lighting and the like.

SUMMARY OF THE INVENTION

It is, therefore, an object of the present invention to provide an integrated control system capable of controlling digital devices included in a home network by using an augmented reality interface.

In accordance with an aspect of the present invention, there is provided an integrated remote control system employing a remote control device for selecting and controlling a plurality of digital devices, each including a bit pattern tag having location information and device information, the remote control device comprising: a display; a light emitting module for emitting light toward the digital devices; a sensor for recognizing the tags of the digital devices; and a controller for analyzing the tags recognized by the sensor to provide the display information of the digital devices on the display and then controlling a digital device selected from the displayed digital devices.

BRIEF DESCRIPTION OF THE DRAWINGS

The above and other objects and features of the present invention will become apparent from the following description of preferred embodiments, given in conjunction with the accompanying drawings, in which.

DETAILED DESCRIPTION OF THE PREFERRED EMBODIMENTS

Hereinafter, preferred embodiments of the present invention will be described in detail with reference to the accompanying drawings.

Figure 1:
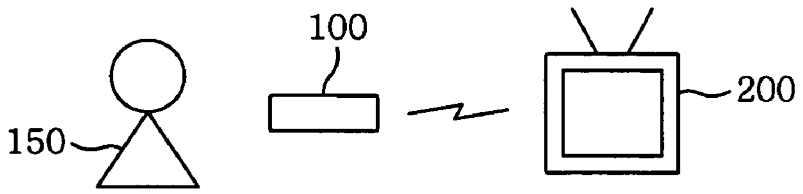
FIG. 1 a schematic diagram showing an integrated remote control system using an augmented reality interface in accordance with an embodiment of the present invention.

FIG. 1 is a schematic diagram showing an integrated remote control system using an augmented reality interface in accordance with an embodiment of the present invention;

An augmented reality is a user interface technique for improving an understanding and a recognition of a reality by providing to a user a single image obtained by overlapping and composing a real image or an actual screen observed by a user with additional virtual information such as messages and graphics in real-time.

As illustrated in FIG. 1, an integrated remote control system includes a remote control device 100 and a digital device 200 having a various tags.

The remote control device 100 includes a small-sized mobile terminal to be described with reference to FIG. 2. The mobile terminal of the remote control device 100 displays thereon an image of the digital device 200 by using an augmented reality interface. The actual digital device 200 displayed on the mobile terminal 100 are attached with location information tags and device information tags to be described with reference to FIG. 3.

When a user 150 selects (clicks) an image where the actual digital device 200 is projected with the mobile terminal 100, a control interface for driving the selected electric appliance is pop-up displayed. The mobile terminal 100 has therein any one of the international standard frameworks, and the control interface varies according to a framework accommodated in the mobile terminal 100. Such a control interface is used for controlling the selected digital device.

Figure 2:
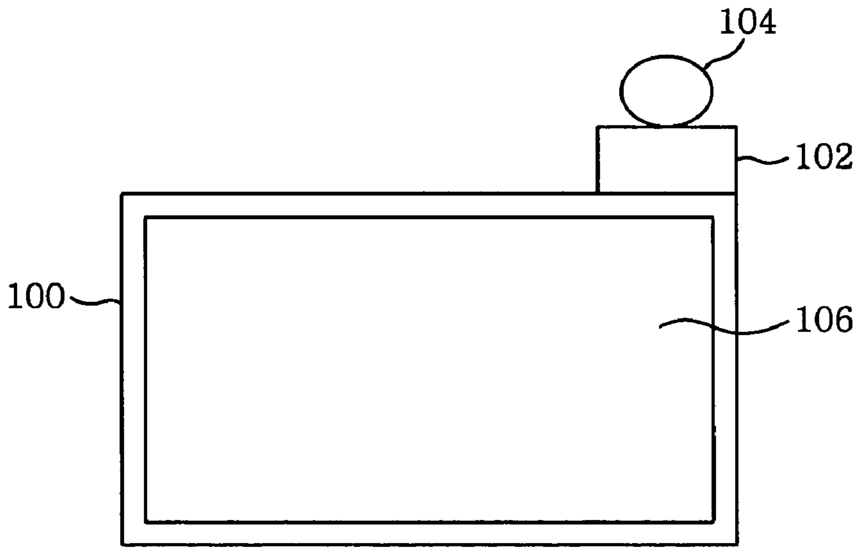
FIG. 2 schematically shows the integrated remote control device of FIG. 1.

FIG. 2 schematically shows the mobile terminal shown in FIG. 1.

As shown in FIG. 2, an example of the mobile terminal 100 in accordance with the present invention is a small-sized mobile terminal, e.g., a tablet PC, having a display 106 that can be easily grabbed and manipulated by a user, wherein the display 106 has a touch screen attached thereon. The mobile terminal 100 of the present invention further has an infrared camera 102 as a sensor for recognizing intrinsic tags attached to digital electric appliances included in the home network.

Further, the mobile terminal 100 of the present invention has on a rear surface thereof a light emitting module 104 for emitting infrared rays toward a desired digital device, to thereby increase a tag recognition rate.

Although it is not illustrated, the mobile terminal 100 of the present invention further includes a controller providing a control interface. The controller analyzes tags of the digital devices which are inputted by the sensor, i.e., the infrared camera 102, and then outputs information of the corresponding digital devices. Further, when a random digital device is selected from the digital devices outputted to the display, the controller controls the corresponding digital device.

In the mobile terminal 100 of the present invention, if the infrared-ray emitting module 104 is driven after the infrared camera 102 is made to face a plurality of digital devices included in the home network, images of the digital devices are captured by the infrared camera 102, and among them, the display information of unique tags attached to the images are displayed on the display 106. When random tag information is selected from the tag information of the multiple digital devices which is outputted to the display 106 of the mobile terminal 100, a control signal for selecting a digital device having the corresponding tag information is transmitted to a home server of a home network and, then, the selected digital device is driven by a remote controller. For example, when the digital device is made to face the mobile terminal 100 for a specific period of time, the mobile terminal 100 transmits the control signal for selecting the corresponding digital device and then implements a control interface for the selected digital device.

Since an indoor lighting state changes depending on time and place, it is difficult for the combined remote controller 100 in accordance with the present invention to accurately recognize the tags attached to the digital devices. To this end, a retro-reflector image is obtained by using the infrared-ray emitting module 104 attached in addition to the camera 102. As a result, it is possible to recognize the electric appliances by vividly distinguishing the tags from the circumstances.

Figure 3:
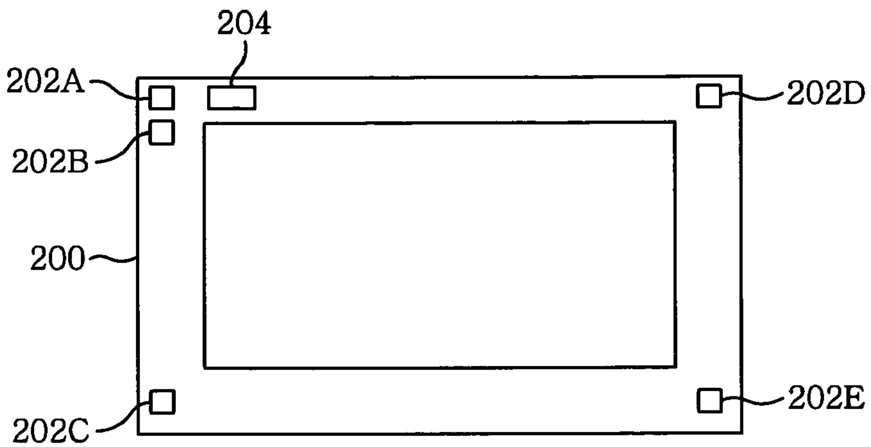
FIG. 3 describes an example of digital devices controlled by the integrated remote control device of FIG. 2.

FIG. 3 describes an example of the digital devices controlled by the combined remote controller in accordance with the present invention.

As illustrated in FIG. 3, tags 202A, 202B, 202C, 202D, 202E and 204 of a bit pattern are attached onto a digital device (e.g., a TV set, an audio device and the like) 200 such as a home network of the present invention, the tags having location information and device information. As shown in FIG. 3, the tags may be made of a retro-reflector material having a size of 2 $cm^2$×2 $cm^2$, for example. Since the retro-reflector is a reflexive reflector for directly reflecting light toward a light source, the bit can be determined depending on an existence/nonexistence of the retro-reflector.

Such tags include a plurality of location information tags 202A, 202B, 202C, 202D and 202E arranged in four corners of the digital device and a single device information tag 204. Among the location information tags 202A, 202B, 202C, 202D and 202E, two upper left tags 202A and 202B are arranged in line with a specific gap therebetween so that they can be distinguished from the remaining tags 202C 202D and 202E respectively arranged in a lower left portion, an upper right portion and a lower right portion. The uppermost left tag 202A is used as a reference location information tag.

Based on the reference tag 202A and the tag 202B adjacent thereto, locations of the remaining three location information tags 202C, 202D and 202E can be estimated. The lower left location information tag 202C is arranged at a lower left side while being spaced from the reference tag 202A at a specific distance, and the upper right tag 202D is diagonally positioned with respect to the lower left location information tag 202C. And, the lower right tag 202E is arranged at a lower right side being diagonally with respect to the reference tag 202A. However, a perspective distortion is generated depending on a location of the camera, so that a tag location error range should be allowed. When not all of the five location tags are accurately included in an input image of the camera, the tags whose positions are obtained are used for estimating locations of the remaining location tags.

Meanwhile, the device information tag 204 is arranged at a right side while being spaced from the upper left tag 202A at a half distance of the corresponding tag on a straight line of the upper left and the upper right tag 202A and 202D.

Figure 4A:
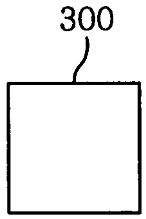
FIGS. 4A and 4B illustrate exemplary location information tags and exemplary device information tags, respectively, both being attached onto a digital.
Figure 4B:
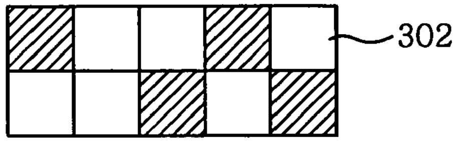

FIGS. 4A and 4B illustrate exemplary location information tags and exemplary device information tags, respectively.

Referring to FIGS. 4A and 4B, reference numerals 300 and 302 respectively illustrate a location information tag and a device information tag, wherein both of the tags are attached onto the digital device. Each of the electric tags 300 and 302 may be formed of a retro-reflector having a size of 2 $cm^2$×2 $cm^2$, for example. Since the retro-reflector is a reflexive reflector for directly reflecting light toward a light source, the bit can be determined depending on the existence/nonexistence of the retro-reflector.

The device information tag 302 needs to have an identification value and thus has a tag design of a matrix pattern. For example, the device information tag 302 is formed of ten small quadrilateral retro-reflectors having a quarter size of the location information tag 300. Bit values are determined depending on the existence/nonexistence of the small retro-reflectors. Thus, 1024 electric tags can be identified by ten bit values, which is sufficient for household appliances. Accordingly, device information of a large number of digital devices can be identified by the device information tag 302.

As described in FIG. 3, the location of the device information tag 302 is determined in advance. In other words, it is positioned at a right side on a straight line of the upper left and the upper right location information tag of the digital device by a half size of the position information tag, so that bit values of the device information tag can be obtained depending on an existence/nonexistence of the retro-reflectors in the area for the tag. That is, if the number of pixels obtained by sampling an area of a small quadrilateral retro-reflector exceeds a specific level, it is recognized as bit values. The bit information of such sampled device information tag 302 is 011011010(=442 (H)).

As described above, in order to easily distinguish the tags, the area of the tags is captured by using an infrared camera having an infrared ray source (infrared ray emitting module) for increasing a brightness of the area. If the image obtained by the infrared camera is binary processed, it is possible to distinguish the tag information from the circumstances. Although there is a chance in which an area not corresponding to tags may be bright due to the lighting or other reflectors, it is different from the tags in shape and thus can be distinguished from the RFID tag.

When a user observes the augmented reality interface implemented in a small-sized terminal, the user can recognize a selected device and a boundary/periphery thereof with the location information tag and the device information tag.

Meanwhile, the digital device controlled by the mobile terminal in accordance with the present invention is a digital device that can be networked according to a lower framework or a conventional remote control digital device.

Figure 5:
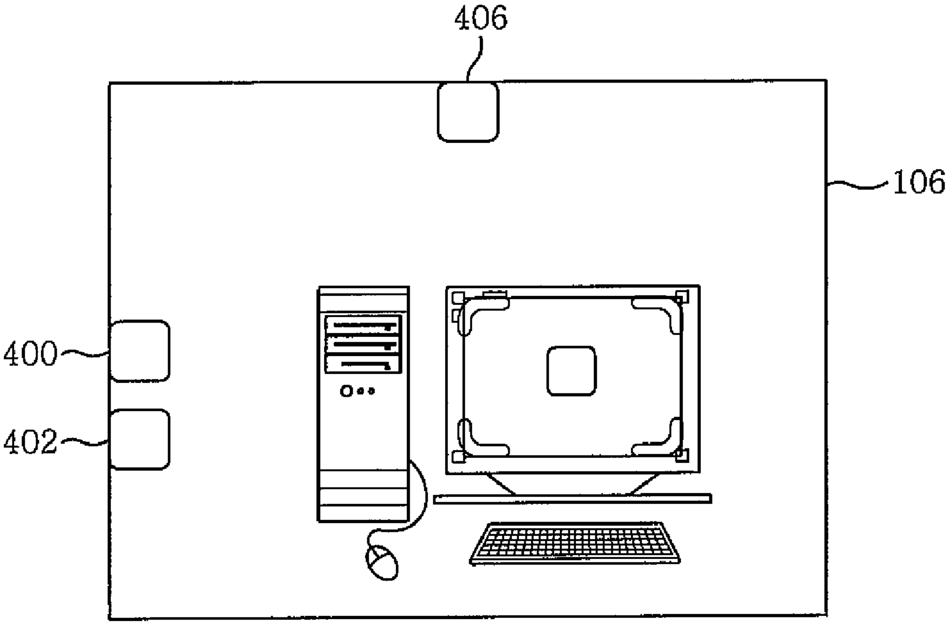
FIG. 5 presents central coordinates and icons of a plurality of digital devices displayed on a display of the integrated remote control device in accordance with the present invention.

Referring to FIG. 5, there are displayed images captured by a camera on a display of the integrated remote control device in accordance with the present invention. For example, when the integrated remote control device is made to face a digital device, e.g., a computer operating as a media center, there are displayed as icons a plurality of digital devices positioned in a capturing area, such as a TV set 400, an audio device 402, a PDA 406 and the like.

In order to select a designated device among the devices displayed on the display 106 in the integrated remote control device, the integrated remote control device needs to move toward the corresponding device. Accordingly, the corresponding digital device is selected after a preset period of time elapses.

In case of the digital devices having a comparatively large volume, such as a television set, an audio device, a computer and the like, it is easy to attach the RFID tags. On the other hand, in case of small-sized digital devices such as a PDA, a digital camera and the like, there is provided a small space where the RFID tags are attached.

Therefore, in the integrated remote control system of the present invention, tags (having device information) of the digital devices are identified and, then, icons of the digital devices are displayed in a preset virtual space (see reference numeral 406 of FIG. 5) of the display. Next, by moving the integrated remote control device to a desired location, a digital device corresponding thereto can be selected. If the digital device is greater than or equal to a predetermined size, the integrated remote control device of the present invention may output the device information of the digital device to the virtual space of the display.

Figure 6:
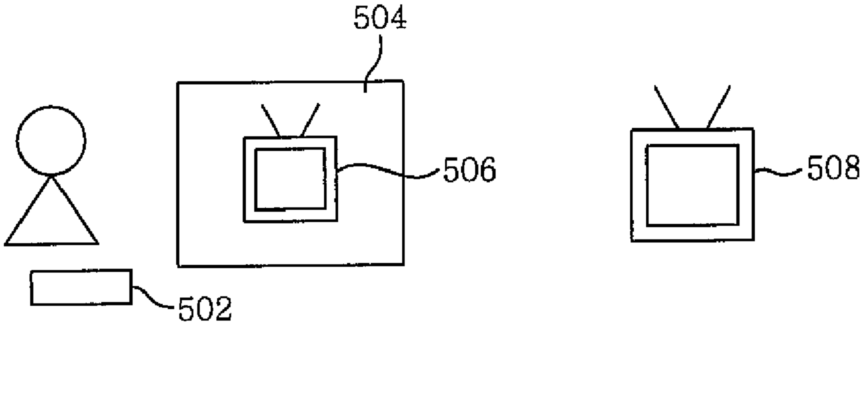
FIG. 6 represents an example of controlling a remote electronic device through a transparent window by using an integrated remote control system in accordance with another embodiment of the present invention.

FIG. 6 depicts an example of controlling a digital device through a transparent window by using a integrated remote control system in accordance with another preferred embodiment of the present invention.

As shown in FIG. 6, an integrated remote control system 502 in accordance with another preferred embodiment of the present invention further includes a transparent window 504, unlike the previous embodiment. Thus, when the user selects (clicks) an image 506 where the actual remote digital device 508 is projected through the transparent window 504, the remote control apparatus for operating the selected digital device is driven. In this case, the actual digital device 508 projected through the transparent window 504 also has RFID tags of the location information and the device information described in FIGS. 2 and 3.

As described above, the present invention provides a integrated remote control system for controlling digital devices such as a home network. In such an integrated remote control system, the RFID tags attached to the digital devices are recognized and then outputted to a display. Accordingly, the integrated remote control system can easily select and remote-control the remote digital devices, so that a user can conveniently use the remote control apparatus in a home network and a ubiquitous environment.

While the invention has been shown and described with respect to the preferred embodiments, it will be understood by those skilled in the art that various changes and modification may be made without departing from the scope of the invention as defined in the following claims.

What is claimed is:

1. An integrated remote control system employing a remote control device for selecting and controlling a plurality of digital devices, each including a bit pattern tag having device information, the remote control device comprising:

a display;

a light emitting module for emitting light toward the digital devices;

a sensor for recognizing the tags of the digital devices and capturing a real time image of the digital devices; and a controller for analyzing the tags recognized by the sensor to provide information of the digital devices on the display together with the real time image of the digital devices in an augmented reality interface, and then controlling a digital device selected from the displayed digital devices;

wherein each said digital devices further comprises a plurality of location information tags that uniquely identify a position of the bit pattern tag for the recognition of the bit pattern tag having the device information of said digital device.

2. The system of claim 1, wherein the tag is made of a retro-reflector and represents a bit pattern value depending on existence/nonexistence of the retro-reflector.

3. The system of claim 1, wherein the sensor includes an infrared camera.

4. The system of claim 1, wherein the light emitting module includes an infrared-ray emitting module.

5. An integrated remote control system for selecting and controlling a plurality of digital devices, each including a bit pattern tag having device information, the system comprising:

a sensor for recognizing the tags of the digital devices;

a light emitting module for emitting light toward the digital devices;

a transparent window through which a real time image of the digital devices is projected;

a controller for analyzing the tags recognized by the sensor to display information of the digital devices together with the real time image of the digital devices in an augmented reality interface, and then controlling a digital device selected from the displayed digital devices;

wherein each said digital devices further comprises a plurality of location information tags that uniquely identify a position of the bit pattern tag for the recognition of the bit pattern tag having the device information of said digital device.

6. The system of claim 5, wherein the tag is made of a retro-reflector and represents a bit pattern value depending on existence/nonexistence of the retro-reflector.

7. The system of claim 5, wherein the sensor includes an infrared camera.

8. The system of claim 5, wherein the light emitting module includes an infrared-ray emitting module.

9. The system of claim 1, wherein, when a digital device is predominantly displayed in real time on the display, other digital devices are displayed as icons around the predominantly displayed digital device.

10. The system of claim 9, wherein the other digital devices are displayed as icons along a peripheral edge of the display.

11. The system of claim 5, wherein, when a digital device is predominantly viewed in real time through the transparent window, other digital devices are displayed as icons around the predominantly viewed digital device.

12. The system of claim 11, wherein the other digital devices are displayed as icons along a peripheral edge of the transparent window.

* * * * *